Patented Mar. 23, 1943

2,314,450

UNITED STATES PATENT OFFICE 2,314,450

EMULSIFYING AND SCOURING ASSISTANT FOR MINERAL SULPHONATES

John B. Holtzclaw, Roselle, and George E. Serniuk, Elizabeth, N. J., assignors to Standard Oil Development Company, a corporation of Delaware No Drawing. Application May 20, 1938, Serial No. 209,112

3 Claims. (Cl. 252—8.7)

This invention relates to the manufacture of emulsions containing oils that are especially adapted to be used as softening and lubricating agents.

Sulphonates, especially oil-soluble sulphonates, have been used with oil in emulsions for softening and oiling textile fibers. One of the disadvantages encountered was that the emulsibility of sulphonates alone with oil and water was not sufficient and therefore other emulsifiers were added, such as triethanolamine, sodium oleate, etc. The resulting emulsion thereby obtained was unstable as it tended to separate into two or more layers and also tended to thicken or gel.

An object of this invention is to prepare a softening and oiling preparation which will produce stable emulsions in water and will not cause the oil concentrate to separate or gel and will also have improved wetting and detergent properties. Another object of this invention is to prepare emulsions containing oil which, when applied to textile fibers, may be removed from the textile fibers on washing with water or any other solutions.

The following examples will serve to illustrate this invention, but it is not intended to limit the invention thereto.

A solution of phenol is contacted with an olefin in the presence of strong sulphuric acid. Where the molecular weight of the olefin is low, such as one having 4 or 5 carbon atoms to the molecule, 2 or more molecules of the olefin for every molecule of the phenol are taken. If the molecular weight of the olefin is comparatively high, such as one having 12 to 19 carbon atoms to the molecule, 1 or 2 molecules of the olefin for each molecule of the phenol may be used. If the olefin contains 20 to 30 or more carbon atoms to the molecule, one molecule of the olefin for every molecule of phenol is taken.

The sulphuric acid that is used not only serves as a catalyst to aid the alkylation of the phenol, but it also reacts with the phenol itself to form a sulphonated product. The resulting product, which is alkylated and sulphonated phenol, is dissolved in a volatile solvent, such as gasoline or a naphtha, and the excess sulphuric acid allowed to settle out. Two layers are formed which are separated. The separated layer containing the alkylated and sulphonated phenol is neutralized with caustic soda or any other alkali to obtain the finished alkali salt of the alkylated phenol sulphonate.

According to this invention, the alkali salt of the alkylated phenol sulphonate is mixed with an oil-soluble sulphonate which had been prepared by treating a petroleum oil with strong sulphuric acid. The proportions of sodium alkylated phenol sulphonates and of the oil-soluble sulphonates used may be varied from 1 to 8 parts of the alkylated phenol sulphonate to 8 parts of the oil-soluble sulphonate. This mixture is mixed with a lubricating oil, preferably a mineral oil or a mixture of a mineral oil and a fatty oil, with or without a small amount of a coupling agent, such as water, or a monohydric or polyhydric alcohol, etc. A uniform clear oil solution is thereby obtained which readily emulsifies when added to cold water, forming a stable white emulsion. This emulsion is used to soften and lubricate textile fibers prior to processing in the mill. The textile fibers, after being processed, are scoured in the usual manner to remove the oil and the softening or wetting agents that have been used. The alkali salts of the sulphonated alkylated phenols that are preferred are the water-soluble alkali salts of isobutyl phenol, such as tri or tetra isobutyl phenol sulphonate, and also amine and onium base salts of the alkylated phenol sulphonates, or mixtures of these salts.

Alkali salts of alkylated phenol sulphonate are used in the following proportions: 11% of oil-soluble sulphonates prepared by treating a petroleum oil with strong sulphuric acid, 3% of a mixture of sodium tri and tetra isobutyl phenol sulphonate, about 1% of water, 1% of diethylene glycol and 84% of 885 mineral lubricating oil. This mixture emulsified readily on mixing with water and was stable to a sulphuric acid solution of 5000 parts of sulphuric acid to a million parts of water, and to a calcium chloride solution of 1250 parts of calcium chloride to a million parts of water. A similar mixture was prepared using sodium tri-isobutyl phenol sulphonate in place of the mixture of sodium tri and tetra isobutyl phenol sulphonate which behaved in a somewhat similar manner as the first mixture on mixing with water and testing as to stability. The second preparation formed a clearer solution. The proportions of sodium alkylated phenol sulphonate to oil-soluble sulphonates that may be used may be varied considerably, that is, from ½ to 5 parts to 5 to 15 parts. It is preferable that the mixture contain at least 5% of the oil-soluble sulphonate. A mixture of 5% of oil-soluble sulphonate, 3% of tri-isobutyl phenol sulphonate in a white mineral lubricating oil of 85 to 90 seconds Saybolt viscosity at 100° F. with or without about 1% of water and/or monohydric alcohol and/or polyhydric alcohol may be used.

Other derivatives of alkylated phenols may be used, for example, an alkylated phenol sulphate. The alkylated phenol sulphate may be prepared by alkylating a phenol, reducing to an alcohol and sulphating the alcohol. The other derivatives that may be used are the derivatives obtained by esterifying or etherifying the alkylated phenol. These derivatives may also be used in admixture with the alkylated phenol sulphonate.

The invention is not to be limited to the specific embodiments shown or the specific examples given, nor to any theories advanced as to the operation of the invention, but in the appended claims it is intended to claim all inherent novelty in the invention as broadly as the prior art permits.

We claim:

1. An emulsifying composition comprising 84% of a mineral lubricating oil, 3% of a mixture of sodium tri and tetra isobutyl phenol sulphonate, 1% of diethylene glycol and 11% of sodium salts of oil-soluble sulphonates prepared by treating a petroleum oil with strong sulphuric acid.

2. An emulsifying composition comprising 84% of a mineral lubricating oil, 2% of sodium tri-isobutyl phenol sulphonate, 1% of diethylene glycol and 11% of sodium salts of oil-soluble sulphonates prepared by treating a petroleum oil with strong sulphuric acid.

3. An emulsifying composition comprising 84% of a mineral lubricating oil, 3% of sodium tetra-isobutyl phenol sulphonate, 1% of diethylene glycol and 11% of sodium salts of oil-soluble sulphonates prepared by treating a petroleum oil with strong sulphuric acid.

JOHN B. HOLTZCLAW.
GEORGE E. SERNIUK.